US011480940B2

(12) United States Patent
Miyoshi

(10) Patent No.: US 11,480,940 B2
(45) Date of Patent: Oct. 25, 2022

(54) CONTROL SYSTEM

(71) Applicant: FANUC CORPORATION, Yamanashi (JP)

(72) Inventor: Takashi Miyoshi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 313 days.

(21) Appl. No.: 16/814,136

(22) Filed: Mar. 10, 2020

(65) Prior Publication Data
US 2020/0310384 A1 Oct. 1, 2020

(30) Foreign Application Priority Data

Mar. 28, 2019 (JP) .............................. JP2019-063999

(51) Int. Cl.
*G05B 19/4069* (2006.01)
*G02B 27/01* (2006.01)
*G05B 19/401* (2006.01)
*G05B 19/409* (2006.01)
*G05B 19/4063* (2006.01)
*G05B 19/414* (2006.01)

(52) U.S. Cl.
CPC ..... *G05B 19/4069* (2013.01); *G02B 27/0172* (2013.01); *G05B 19/401* (2013.01); *G02B 2027/014* (2013.01); *G02B 2027/0178* (2013.01)

(58) Field of Classification Search
USPC ........................................................ 700/180
See application file for complete search history.

(56) References Cited

U.S. PATENT DOCUMENTS 8,427,396 B1\* 4/2013 Kim ..................... G02B 27/017
345/8
2011/0248859 A1\* 10/2011 Park ..................... H04N 13/332
348/51

(Continued)

FOREIGN PATENT DOCUMENTS

JP 08-006708 1/1996
JP 2012-173476 9/2012

(Continued)

OTHER PUBLICATIONS

Notification of Reasons for Refusal dated May 18, 2021 in corresponding Japanese Patent Application No. 2019-063999.

*Primary Examiner* — Chineyere D Wills-Burns
(74) *Attorney, Agent, or Firm* — Wenderoth, Lind & Ponack, L.L.P.

(57) ABSTRACT

A control system controls an industrial machine, and each of controllers includes a screen generation unit which generates a controller screen that is displayed on a controller display unit and which generates a glasses screen that is displayed on s glasses-type display device based on a variation in an internal state of the controller screen and the glasses-type display device includes: a transmissive glasses display unit which is arranged so as to correspond to the positions of the eyes of a wearer and which can display the generated glasses screen; a glasses side transmission/reception unit which acquires specific information for specifying the controller that is connected; and a display control unit which displays the glasses screen and the specific information on the glasses display unit.

5 Claims, 9 Drawing Sheets

(56) References Cited

U.S. PATENT DOCUMENTS

| | | | | |
|---|---|---|---|---|
| 2012/0302289 A1* | 11/2012 | Kang | .................. | G06F 3/016 |
| | | | | 455/557 |
| 2013/0044043 A1* | 2/2013 | Abdollahi | ............ | A42B 3/0433 |
| | | | | 345/8 |
| 2014/0313863 A1* | 10/2014 | Lee | ................... | H04M 1/21 |
| | | | | 368/10 |
| 2014/0331334 A1* | 11/2014 | Kamai | ................... | G09G 5/14 |
| | | | | 726/28 |
| 2015/0128292 A1* | 5/2015 | Malecki | .................. | G06F 21/31 |
| | | | | 726/28 |
| 2016/0109957 A1* | 4/2016 | Takashima | ............ | G06F 3/0425 |
| | | | | 345/8 |
| 2016/0247324 A1* | 8/2016 | Mullins | ............... | G02B 27/0179 |
| 2016/0345124 A1* | 11/2016 | Ahn | ................... | H04B 5/02 |
| 2017/0358140 A1* | 12/2017 | Kohler | .................. | G02B 27/0172 |

FOREIGN PATENT DOCUMENTS

| | | |
|---|---|---|
| JP | 2014-219448 | 11/2014 |
| JP | 2018-151742 | 9/2018 |
| JP | 2018-181232 | 11/2018 |
| JP | 2019-032611 | 2/2019 |

\* cited by examiner

FIG. 1
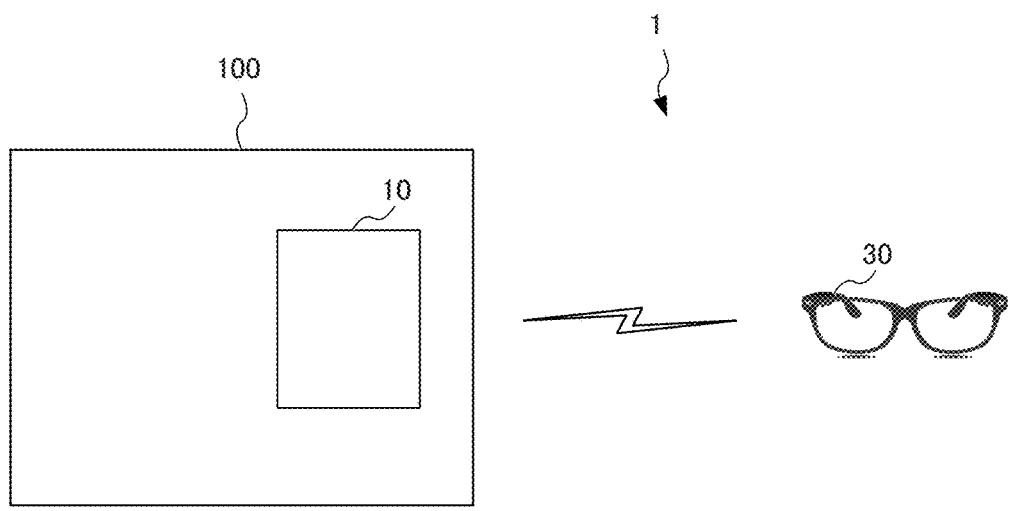
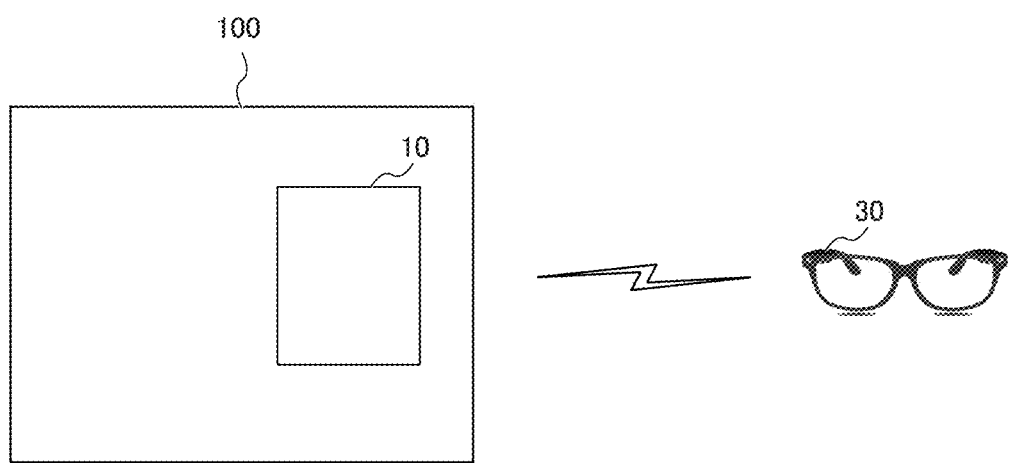

CONTROL SYSTEM

This application is based on and claims the benefit of priority from Japanese Patent Application No. 2019-063999, filed on 28 Mar. 2019, the content of which is incorporated herein by reference.

BACKGROUND OF THE INVENTION

Field of the Invention

The present invention relates to a control system which controls an industrial machine.

Related Art

Conventionally, an industrial machine is known in which a numerical controller (CNC, computerized numerical control) for performing machining processing is incorporated and examples of which include an industrial robot and a machine tool. The operation of the industrial machine is controlled by the numerical controller. State information such as the operation state, the setting status and the like of the industrial machine may be output from the numerical controller to the outside. For example, the state information may be displayed on a display unit arranged in the numerical controller.

Incidentally, in the state information displayed on the display unit, information (confidential information) which is not desired to be seen by a person other than a related person (manager) may be included. Hence, an access management method is known in which whether or not a person is the related person is previously authenticated, and in which only when it is authenticated, the confidential information is displayed on the display unit. As another method, a method is known in which the confidential information is not displayed on the display unit of the numerical controller, and in which the confidential information is output from the numerical controller to an external terminal arranged in a position away from the installation location of the numerical controller.

However, even the access management method remains the same in that the confidential information is displayed on the display unit. Hence, it is likely that the confidential information is seen by surrounding people other than the related person. By contrast, in the method of outputting the confidential information to the external terminal, the possibility that the confidential information is seen by surrounding people is lowered. On the other hand, the related person cannot operate the numerical controller while seeing the confidential information. Hence, it takes time and effort to operate the numerical controller while checking the confidential information. Therefore, a system is proposed in which it is possible to check the confidential information in the installation position of the numerical controller without the confidential information being seen by surrounding people (see, for example, Patent Document 1).

Patent Document 1: Japanese Unexamined Patent Application, Publication No. 2014-219448

SUMMARY OF THE INVENTION

In Patent Document 1, a tablet terminal and a head mounted display device (glasses-type display device) are used. In the tablet terminal, non-confidential information (information which is not confidential information) is displayed. In the head mounted display device, the confidential information is displayed. The head mounted display device is used to browse the screen of the tablet terminal, and thus the non-confidential information and the confidential information are superimposed on each other. In other words, both the non-confidential information displayed on the tablet terminal and the confidential information displayed on the head mounted display device are superimposed on each other. In this way, it is possible to overlay the pictures of both the non-confidential information and the confidential information on each other so as to browse them. Hence, it is possible to check the confidential information in the position of the tablet terminal without the confidential information being seen by surrounding people.

For example, in the case of application to a plurality of numerical controllers arranged in a factory, industrial machines (models) which are individually controlled by the numerical controllers are different. The states of the industrial machines at the same time are also different. Hence, it is desirable that for each of the numerical controllers, the display of a glasses-type display device which is combined therewith can be changed. The details thereof are also applied to controllers other than numerical controllers.

(1) One aspect of the present disclosure is a control system for controlling an industrial machine that includes a plurality of controllers each of which includes a controller display unit and a glasses-type display device which is combined with any one of the controllers so as to be connected thereto, each of the controllers includes: a screen generation unit which generates a controller screen that is displayed on the controller display unit and which generates a glasses screen that is displayed on the glasses-type display device based on a variation in an internal state of the controller and the glasses-type display device includes: a transmissive glasses display unit which is arranged so as to correspond to the positions of the eyes of a wearer and which can display the generated glasses screen; a glasses side transmission/reception unit which acquires specific information for specifying the controller that is combined so as to be connected; and a display control unit which displays the glasses screen and the specific information on the glasses display unit.

According to one aspect, it is possible to provide a control system which controls an industrial machine and which can change, for each of a plurality of controllers, the display of a glasses-type display device that is combined therewith.

BRIEF DESCRIPTION OF THE DRAWINGS

FIG. 1 is a schematic view showing a relationship between a plurality of numerical controllers and a glasses-type display device in a numerical control system according to an embodiment;

DETAILED DESCRIPTION OF THE INVENTION

Figure 2:
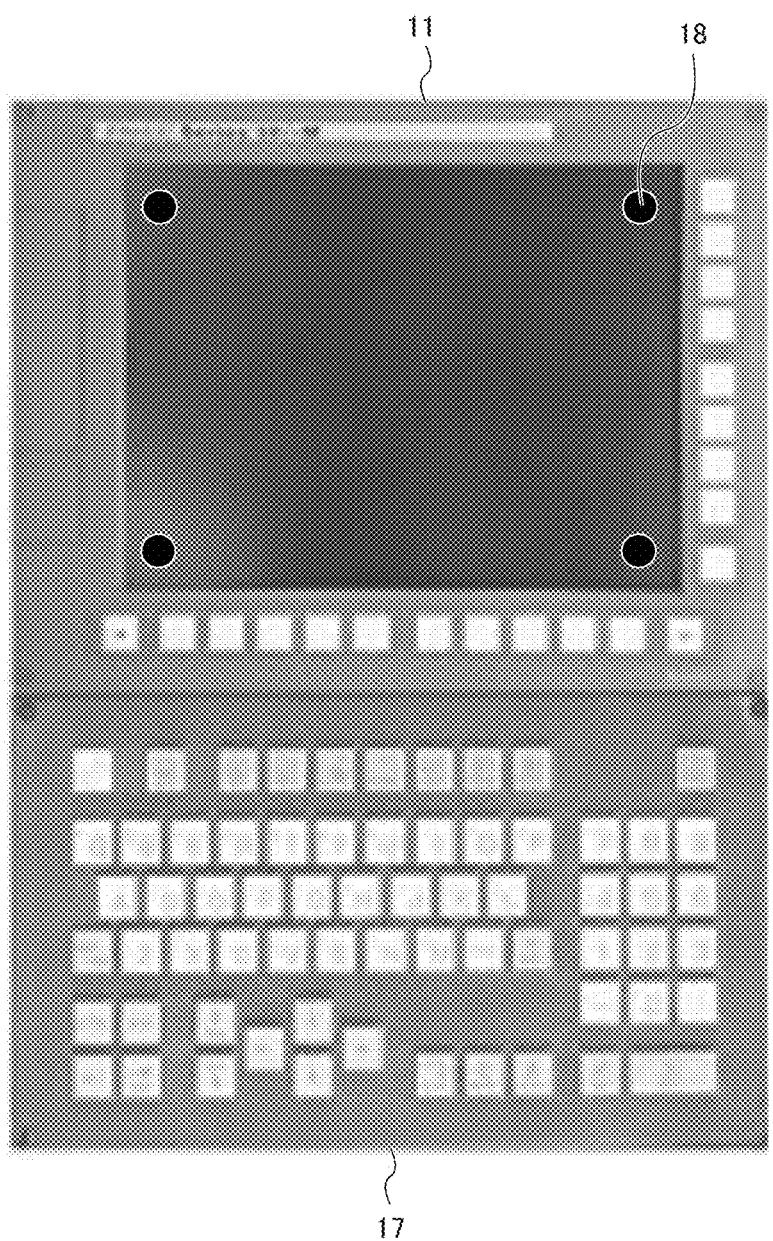
FIG. 2 is a schematic view showing a controller display unit in the numerical control system of the embodiment.

A numerical control system 1 according to an embodiment of the present disclosure will be described below with reference to FIGS. 1 to 9. The numerical control system 1 according to the embodiment is an example of the control system of the present invention, and a numerical controller 10 is an example of a controller included in the control system of the present invention. The numerical control system 1 according to the present embodiment is provided within a factory in which a plurality of industrial machines 100 are installed. In each of the industrial machines 100, the numerical controllers 10 are incorporated. Each of a plurality of numerical control systems 1 includes, as shown in FIGS. 1 and 2, a plurality of numerical controllers 10 which include controller display units 11 and a glasses-type display device 30 which is combined with any one of the numerical controllers 10 so as to be connected thereto. Examples of the industrial machine include a machine tool, an industrial robot and other machines (including various machines such as a service robot, a forging machine and an injection molding machine).

Figure 3:
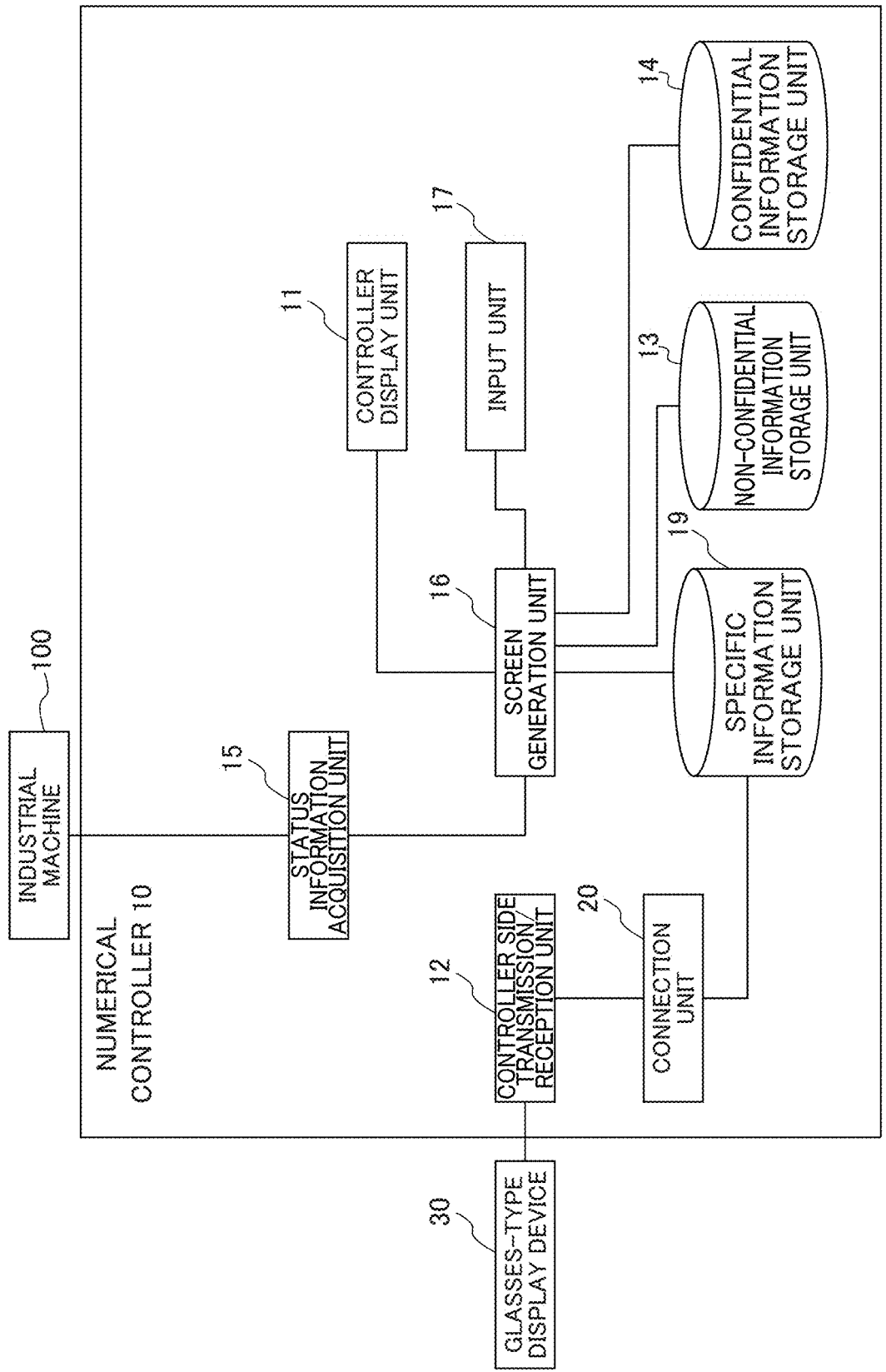
FIG. 3 is a block diagram showing the numerical controller in the numerical control system of the embodiment.

The individual numerical controllers 10 are devices that control the operation of the industrial machine 100 in which the individual numerical controllers 10 are incorporated. The individual numerical controllers 10 are installed, for example, within a factory, in the industrial machine 100 in which the individual numerical controllers 10 are incorporated. Each of the numerical controllers 10 includes, as shown in FIGS. 2 and 3, a controller side transmission/reception unit 12, a non-confidential information storage unit 13, a confidential information storage unit 14, a status information acquisition unit 15, a screen generation unit 16, a controller display unit 11, an input unit 17, a sign portion 18, a specific information storage unit 19 and a connection unit 20.

The controller side transmission/reception unit 12 is, for example, a communication device. The controller side transmission/reception unit 12 can establish a session with the glasses-type display device 30 with which the controller side transmission/reception unit 12 is combined. The controller side transmission/reception unit 12 transmits and receives data to and from the glasses-type display device 30 with which the controller side transmission/reception unit 12 is combined.

The non-confidential information storage unit 13 is, for example, a secondary storage medium such as a hard disk. The non-confidential information storage unit 13 stores, for example, non-confidential information which can be browsed by anyone. In other words, the non-confidential information storage unit 13 stores non-confidential information which can be displayed on the controller display unit 11.

The confidential information storage unit 14 is, for example, a secondary storage medium such as a hard disk. The confidential information storage unit 14 stores, for example, confidential information which can be browsed only by a related person (manager). In other words, the confidential information storage unit 14 stores the confidential information which can be displayed only on the glasses-type display device 30. In the present embodiment, the confidential information storage unit 14 stores the confidential information which is associated with the non-confidential information stored in the non-confidential information storage unit 13. In other words, the confidential information storage unit 14 stores the confidential information which is made to correspond to the non-confidential information stored in the non-confidential information storage unit 13.

The status information acquisition unit 15 is realized, for example, by the operation of a CPU. The status information acquisition unit 15 acquires, for example, the operation state of the industrial machine 100 in which the status information acquisition unit 15 is incorporated (whether or not the industrial machine 100 can be operated). The status information acquisition unit 15 acquires, for example, on the industrial machine 100, as status information, a machining state indicating a machining status in progress, an operation state indicating whether or not the industrial machines 100 is in operation, what operation is being operated, whether or not a setting screen for setting values is called, whether or not a failure occurs and the like.

Figure 4:
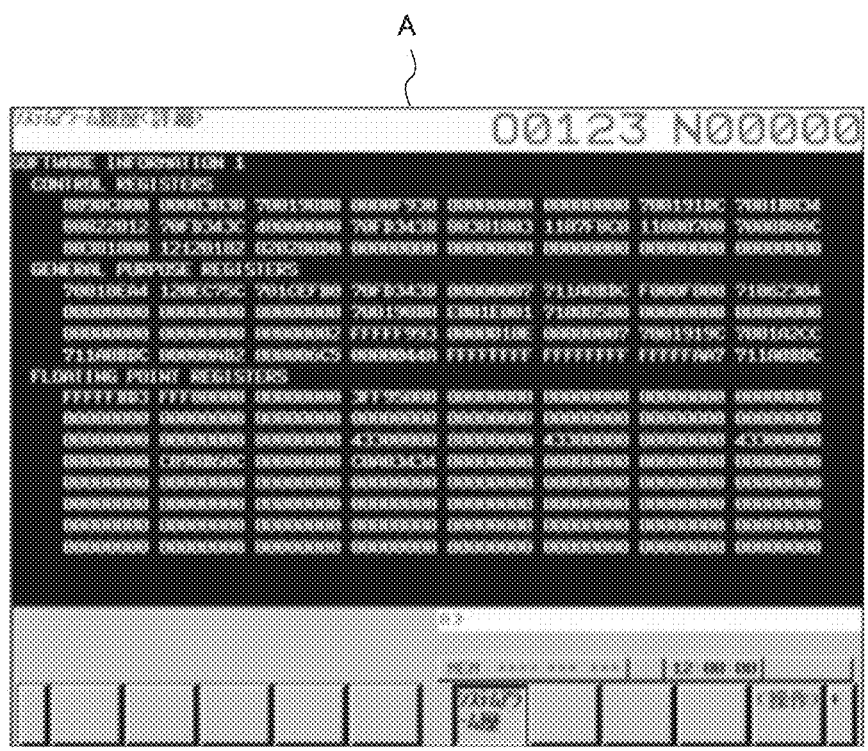
FIG. 4 is a screen view showing a controller screen in the numerical control system of the embodiment.
Figure 5:
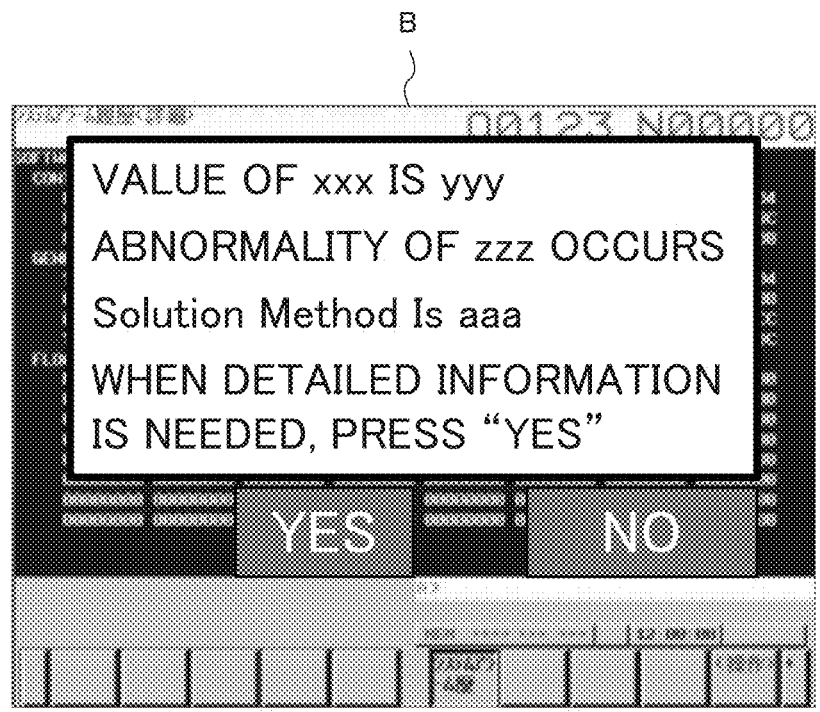
FIG. 5 is a screen view showing a glasses screen which is superimposed on the controller screen in the numerical control system of the embodiment.

The screen generation unit 16 is realized, for example, by the operation of the CPU. For example, the screen generation unit 16 generates a controller screen A as shown in FIG. 4 displayed on the controller display unit 11, and generates, based on a variation in the internal state of the numerical controller 10, a glasses screen B as shown in FIG. 5 displayed on the glasses-type display device 30. Here, examples of the "variation in the internal state of the numerical controller 10" include a variation in an error state and a variation in the operation status. The screen generation unit 16 generates the controller screen A, for example, based on the status information acquired with the status information acquisition unit 15. Specifically, the screen generation unit 16 reads, based on the acquired status information, the corresponding non-confidential information from the non-confidential information storage unit 13. The screen generation unit 16 generates the controller screen A from the non-confidential information. The screen generation unit 16 displays, for example, as the controller screen A, a dummy screen which is not related to the state of the numerical controller 10. Then, when the acquired status information is changed, the screen generation unit 16 generates the controller screen A based on the status information after being changed.

The screen generation unit 16 generates, for example, based on the acquired status information, the glasses screen B displayed on the glasses-type display device 30. Specifically, the screen generation unit 16 reads, based on the acquired status information, the corresponding confidential information from the confidential information storage unit 14. The screen generation unit 16 generates the glasses screen B from the confidential information. When the controller screen A is changed, the screen generation unit 16 acquires, from the confidential information storage unit 14, the confidential information corresponding to the non-confidential information used for the controller screen A after being changed. The screen generation unit 16 uses the acquired confidential information so as to generate the glasses screen B. In the present embodiment, the screen generation unit 16 generates the glasses screen B, for example, based on the changed state information and the changed controller screen A. Specifically, the screen generation unit 16 uses the confidential information selected according to the acquired state information among a plurality of pieces of confidential information corresponding to the non-confidential information used for the changed controller screen A, and thereby generates the glasses screen B. For example, the screen generation unit 16 generates the dummy screen as the controller screen A, and generates a screen for operating the numerical controller 10 as the glasses screen B. The screen generation unit 16 generates, based on the state information of the numerical controller 10, the glasses screen B including whether or not the numerical controller 10 can be operated. When an input is made to the input unit 17 which will be described later, the screen generation unit 16 generates the controller screen A and the glasses screen B which reflect the input.

The generation of the glasses screen B may be performed in a display control unit 33 instead of the screen generation unit 16. In this case, the screen generation unit 16 outputs information necessary for the generation of the glasses screen B. In this way, it is possible to display a desired screen (glasses screen B) on the glasses-type display device 30 without need to change (update) software stored in the numerical controller 10 according to the glasses-type display device 30. In other words, software stored in the glasses-type display device 30 is changed (updated), and thus it is possible to display the desired screen (glasses screen B). In this way, it is possible to change the screen which is displayed on the glasses-type display device 30 while reducing an influence exerted on the operation of the numerical controller 10.

The controller display unit 11 is, for example, a display device such as a monitor. As shown in FIG. 2, the controller display unit 11 can display the controller screen A generated with the screen generation unit 16.

The input unit 17 is, for example, an input device such as a keyboard. As shown in FIG. 2, the input unit 17 is arranged side by side with the controller display unit 11.

The sign portion 18 is, for example, a mark which is indicated in the controller display unit 11. The sign portion 18 is provided in order for the glasses-type display device 30 to specify the position of the controller display unit 11 in the numerical controller 10. In the present embodiment, the sign portion 18 is formed as the mark displayed on the controller display unit 11. The sign portion 18 is displayed, for example, in the positions of corner portions of the controller display unit 11.

The specific information storage unit 19 is, for example, a secondary storage medium such as a hard disk. The specific information storage unit 19 stores specific information which includes at least one of a map of a line of the factory where the numerical controllers 10 are arranged, identification information for identifying the numerical controllers 10 and the model name of the industrial machine 100 that incorporates the numerical controllers 10. At least one of the map of the line of the factory, the identification information for identifying the numerical controllers 10 and the model name of the industrial machine 100 that incorporates the numerical controllers 10 may be stored in a higher level server (not shown) instead of the numerical controllers 10.

The connection unit 20 is realized, for example, by the operation of the CPU. The connection unit 20 establishes the session with the glasses-type display device 30 arranged within the factory. For example, the connection unit 20 requires the glasses-type display device 30 arranged within the factory to make connection thereto so as to establish the session with the glasses-type display device 30. The connection unit 20 can read the specific information from the specific information storage unit 19 so as to provide it to the glasses-type display device 30.

Figure 6:
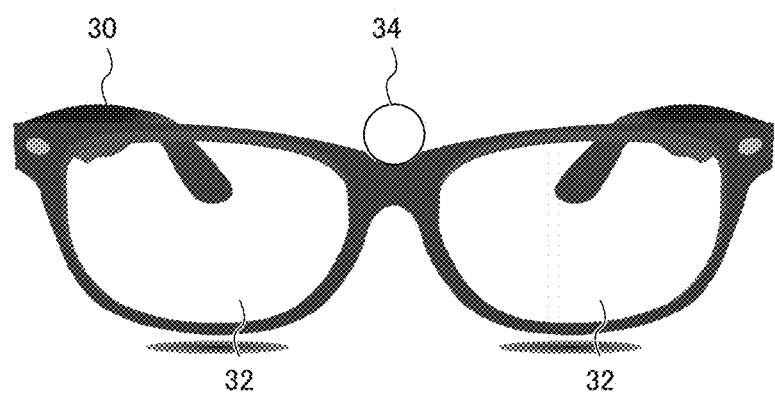
FIG. 6 is a schematic front view showing the glasses-type display device in the numerical control system of the embodiment.
Figure 7:
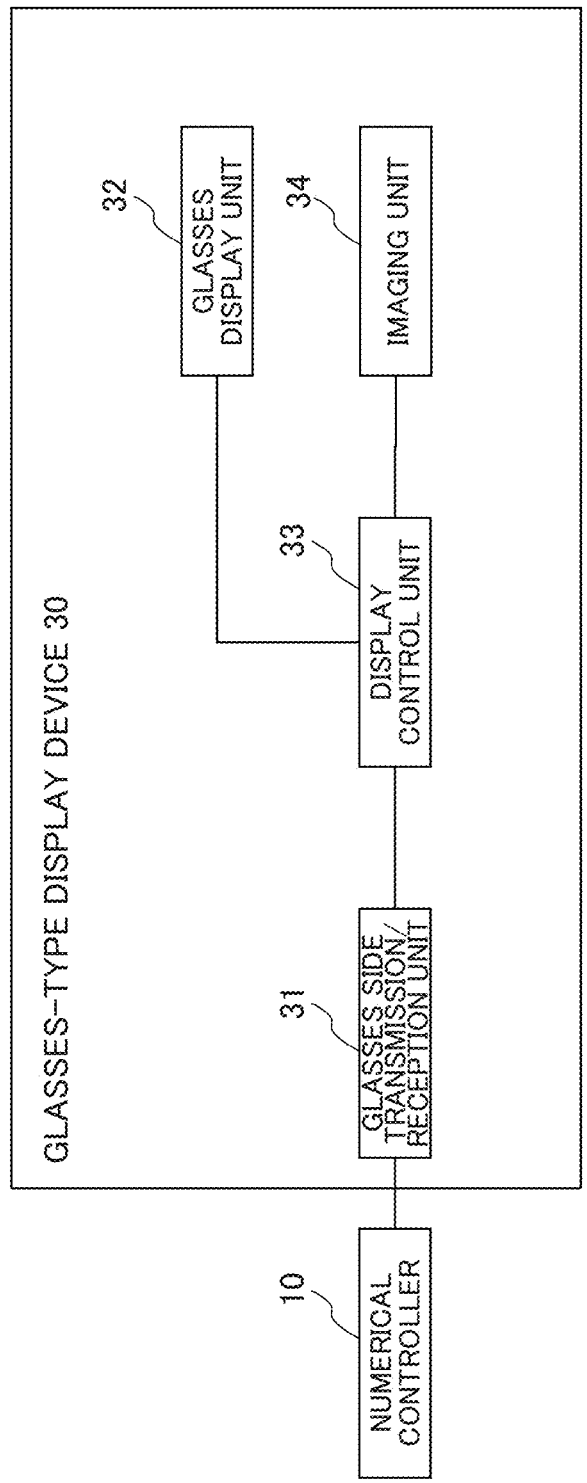
FIG. 7 is a block diagram showing the glasses-type display device is the numerical control system of the embodiment.

As shown in FIGS. 6 and 7, the glasses-type display device 30 is a glasses-type device (also referred to as AR glasses, an AR headset or an AR visor) which is worn by the related person (hereinafter also referred to as a wearer) who manages the numerical controllers 10. The glasses-type display device 30 is combined with any one of the numerical controllers 10 so as to realize an AR function. For example, the glasses-type display device 30 is connected so as to correspond to one numerical controller 10. The glasses-type display device 30 includes a glasses side transmission/reception unit 31, a glasses display unit 32, a display control unit 33 and an imaging unit 34.

The glasses side transmission/reception unit 31 is, for example, a communication module. The glasses side transmission/reception unit 31 transmits and receives data to and from the numerical controller 10 with which the session is established. The glasses side transmission/reception unit 31 acquires the specific information for specifying the numerical controller 10 which is combined so as to be connected.

The glasses display unit 32 is a transmissive lens device which is arranged so as to correspond to the positions of the eyes of the wearer and which can display the generated glasses screen B. For example, the glasses display unit 32 is provided as a pair so as to correspond to the eyes of the wearer. The glasses display unit 32 superimposes an image to be displayed on a picture which is passed therethrough, and thereby displays it for the wearer.

The imaging unit 34 is, for example, an image acquisition device such as a lens. The imaging unit 34 images a position opposite an outer surface of the glasses display unit 32.

The display control unit 33 is realized, for example, by the operation of the CPU. The display control unit 33 displays the glasses screen B and the specific information on the glasses display unit 32. The display control unit 33 displays, on the glasses display unit 32, for example, the glasses screen B generated with the numerical controller 10 with which the session is established and the information (specific information) of the model of the numerical controller 10 corresponding to the displayed glasses screen B. The display control unit 33 also displays, on the glasses display unit 32, for example, the map of the factory and information for identifying the numerical controllers 10 in the map.

The display control unit 33 recognizes the position of the controller display unit 11 based on the position of the sign portion 18 included in an image obtained by imaging with the imaging unit 34. Then, the display control unit 33 superimposes the glasses screen B on the display region of the controller display unit 11 so as to display the glasses screen B on the glasses display unit 32. For example, the display control unit 33 recognizes the display region of the controller display unit 11 from the positions of the sign portions 18 arranged in the four corners of the controller display unit 11. The display control unit 33 superimposes the glasses screen B on the recognized display region so as to display the glasses screen B. In other words, the display control unit 33 superimposes, among pictures which are passed through the glasses display unit 32, the glasses screen B on the display region of the controller display unit 11 so as to display the glasses screen B.

When a system alarm occurs in the industrial machine 100, the display control unit 33 generates, for example, the controller screen A as shown in FIG. 4 in which numerical values are listed. In addition thereto, the display control unit 33 generates, for example, the glasses screen B as shown in FIG. 5 which indicates measures. When the operation of the industrial machine 100 is transferred to the subsequent step, the display control unit 33 generates the glasses screen B which includes values set in the step that is being operated. The display control unit 33 uses, as a trigger, an input from the input unit 17 so as to generate the glasses screen B which reflects the result of the input.

Figure 8:
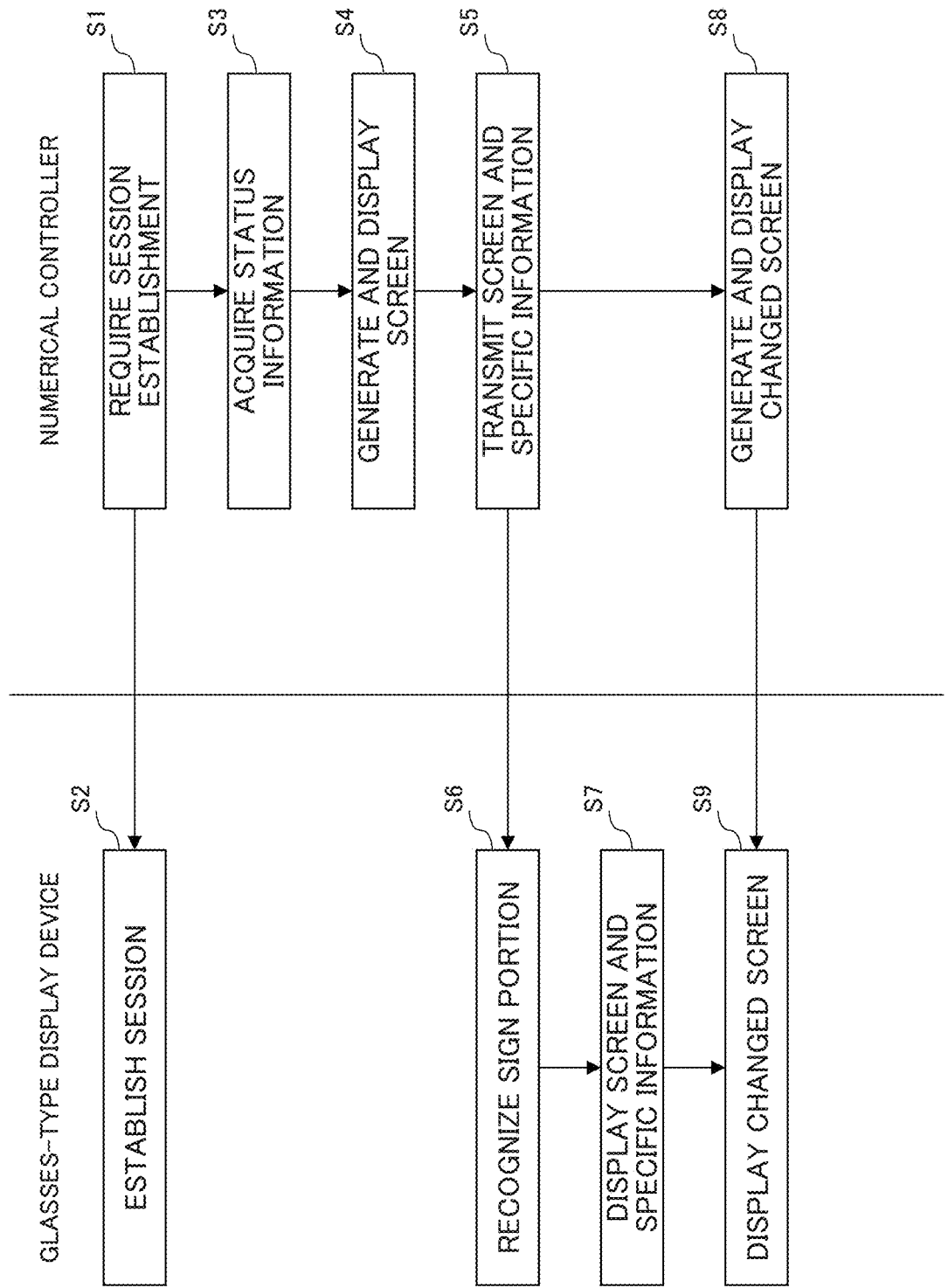
FIG. 8 is a state transition diagram showing the state transition of the numerical control system of the embodiment.

The operation of the numerical control system 1 will then be described with reference to FIG. 8. The numerical controller 10 first requires the glasses-type display device 30 present within the factory to establish the session (step S1). Specifically, the connection unit 20 requires the glasses-type display device 30 to establish the session. The glasses-type display device 30 receives the requirement so as to establish the session (step S2). Specifically, the display control unit 33 receives the requirement so as to establish the session with the numerical controller 10.

Figure 9:
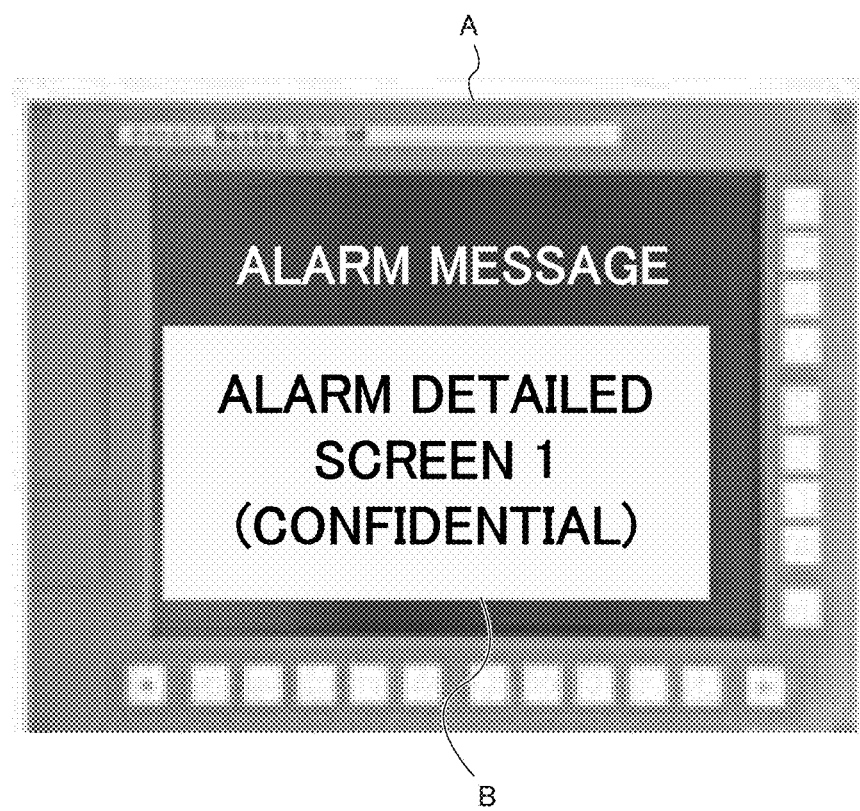
FIG. 9 is a screen view showing the glasses screen which is superimposed on the controller screen in the numerical control system of the embodiment.

Then, the status information acquisition unit 15 acquires the status information (step S3). The screen generation unit 16 acquires, based on the acquired status information, the non-confidential information and the confidential information so as to generate the controller screen A and the glasses screen B (step S4). For example, when a system alarm (failure) occurs, the screen generation unit 16 generates the controller screen A as shown in FIG. 4 and the glasses screen B as shown in FIG. 5. For example, when the system alarm (failure) occurs, the screen generation unit 16 generates the controller screen A as shown in FIG. 9 which includes an alarm message and the glasses screen B which includes an alarm detail screen. In other words, the screen generation unit 16 generates the controller screen A which displays only the alarm message and the glasses screen B which indicates details corresponding to the alarm message.

Then, the screen generation unit 16 displays the controller screen A on the controller display unit 11. The screen generation unit 16 also transmits the glasses screen B to the glasses-type display device 30 (step S5). The connection unit 20 transmits the specific information to the glasses-type display device 30.

The display control unit 33 recognizes the sign portion 18 included in the image obtained by imaging with the imaging unit 34 (step S6). The display control unit 33 superimposes, based on the position of the recognized sign portion 18, the glasses screen B on the display region of the controller display unit 11 so as to display the glasses screen B on the glasses display unit 32 (step S7). Here, the display control unit 33 displays, on the glasses display unit 32, the acquired specific information together with the glasses screen B.

Then, the display control unit 33 generates, based on a variation in the controller screen A, the changed glasses screen B (step S8). The display control unit 33 transmits the generated glasses screen B to the glasses-type display device 30. The display control unit 33 displays the transmitted glasses screen B on the glasses display unit 32 (step S9).

When the numerical controller 10 receives an input from the wearer, the input unit 17 receives the input from the wearer. The screen generation unit 16 generates the controller screen A and the glasses screen B which reflect the input to the input unit 17.

In the numerical control system 1 described above and according to the present embodiment, the following effects are achieved.

(1) The control system 1 includes a plurality of numerical controllers 10 each of which includes the controller display unit 11 and the glasses-type display device 30 which is combined with any one of the numerical controller 10 so as to be connected thereto, each of the numerical controller 10 includes: the screen generation unit 16 which generates the controller screen A that is displayed on the controller display unit 11 and which generates the glasses screen B that is displayed on the glasses-type display device 30 based on a variation in an internal state of the numerical controller 10 and the glasses-type display device 30 includes: the transmissive glasses display unit 32 which is arranged so as to correspond to the positions of the eyes of the wearer and which can display the generated glasses screen B; the glasses side transmission/reception unit 31 which acquires the specific information for specifying the numerical controller 10 that is combined so as to be connected; and the display control unit 33 which displays the glasses screen B and the specific information on the glasses display unit 32. In this way, the numerical controller 10 which is specified and the glasses screen B which corresponds to the numerical controller 10 can be displayed so as to correspond to each other. Hence, the display of the glasses-type display device 30 can be changed according to each of the numerical controllers 10.

(2) The glasses side transmission/reception unit 31 can acquire the specific information which includes at least one of the map of the line of the factory where the numerical controller 10 are arranged, the identification information for identifying the numerical controllers 10 and the model name of the industrial machine that incorporates the numerical controllers 10. Hence, the numerical controller 10 which corresponds to the glasses screen B can easily be specified.

(3) Each of the numerical controllers 10 further includes the sign portion 18 for making the glasses-type display device 30 specify the position of the controller display unit 11, the glasses-type display device further includes the imaging unit 34 which images the position opposite the outer surface of the glasses display unit 32 and the display control unit 33 recognizes the position of the controller display unit 11 based on the position of the sign portion 18 included in the image obtained by the imaging with the imaging unit 34, and superimposes the glasses screen B on the display region of the controller display unit 11 that is passed through the glass display unit so as to display the glasses screen B on the glasses display unit 32. In this way, it is possible to check the glasses screen B while checking the display of the controller screen A, and thus the management of the numerical controllers 10 can be made easier.

(4) The screen generation unit 16 generates, based on the state of the numerical controller 10, the glasses screen B which includes whether or not the numerical controller 10 can be operated. In this way, it is possible to easily determine whether or not an input needs to be made to the numerical controller 10, and thus it is possible to reduce the making of the input in a state where it is impossible to perform the operation.

(5) The screen generation unit 16 generates the dummy screen as the controller screen A and generates, as the glasses screen B, the screen for operating the numerical controller 10. In this way, it is possible to use the glasses screen B so as to perform an appropriate operation while displaying, on the controller screen A, the information which has little influence even when being browsed.

(6) The screen generation unit 16 generates the controller screen A which notifies the occurrence of a failure, and generates the glasses screen B which includes a measure against the failure. In this way, even when a failure occurs, it is possible to rapidly cope with the failure.

Although the preferred embodiment of the control system of the present disclosure is described above, the present disclosure is not limited to the embodiment described above, and can be changed as necessary. For example, in the embodiment described above, the input unit 17 may be arranged so as to be overlaid on the screen of the controller display unit 11. For example, each of the numerical controllers 10 may include a touch input unit 17 which is arranged so as to be overlaid on the controller display unit 11.

Although in the embodiment described above, each of the numerical controllers 10 requires all the glasses-type display devices 30 arranged within the factory to establish the session, there is no limitation to this configuration. For example, each of the numerical controllers 10 may require part of the glasses-type display devices 30 arranged within the factory to establish the session. In other words, for each of the glasses-type display devices 30, the numerical controller 10 which can receive the glasses screen B may be previously set.

In the embodiment described above, the sign portion 18 may be included in the controller screen A. For example, the sign portion 18 may be generated, with the screen generation unit 16, within the controller screen A.

Although in the embodiment described above, the display control unit 33 uses the specific information included in the sign portion 18 so as to produce the display on the glasses display unit 32, there is no limitation to this configuration. For example, the identification of the numerical controller 10 (identification of the glasses screen B displayed on the glasses-type display device 30) may be performed based on the position of the numerical controller 10 and the position of the glasses-type display device 30.

In the embodiment described above, the numerical control system 1 may further include a server (not shown) which is interposed between the numerical controllers 10 and the glasses-type display device 30. The server may store glasses images which are transmitted from the individual numerical controllers 10. The server may manage the session between the numerical controllers 10 and the glasses-type display device 30. For example, the server may transmit, to the glasses-type display device 30, the glasses image of the numerical controller 10 with which the session is established. The controller may be a controller other than the numerical controller.

EXPLANATION OF REFERENCE NUMERALS

1 numerical control system (control system)
10 numerical controller (controller)
11 controller display unit
16 screen generation unit
17 input unit
18 sign portion
30 glasses-type display device
31 glasses side transmission/reception unit
32 glasses display unit
33 display control unit
34 imaging unit
100 industrial machine
A controller screen
B glasses screen

What is claimed is:

1. A control system for controlling an industrial machine that includes a plurality of controllers each of which includes a controller display and a glasses-type display device which is combined with any one of the controllers so as to be connected thereto, wherein each of the controllers executes a program to: generate a controller screen that is displayed on the controller display and which generates a glasses screen that is displayed on the glasses-type display device based on a variation in an internal state of the controller, and the glasses-type display device acquires specific information for specifying the controller that is combined so as to be connected and includes: a transmissive glasses display which is arranged so as to correspond to positions of eyes of a wearer and which can display the generated glasses screen; and a display controller which executes a program and displays the glasses screen and the specific information on the glasses display, wherein each of the controllers further includes a sign portion for making the glasses-type display device specify a position of the controller display, the glasses-type display device further includes an imaging lens which images a position opposite an outer surface of the glasses display and the display controller executes a program to recognize the position of the controller display based on a position of the sign portion included in an image obtained by the imaging with the imaging lens, and superimposes the glasses screen on a display region of the controller display that is passed through a glass display so as to display the glasses screen on the glasses display.

2. The control system according to claim 1, wherein each of the controllers executes the program to generate, based on a state of the controller, the glasses screen which includes whether or not the controller can be operated.

3. The control system according to claim 1, wherein each of the controllers executes the program to generate a dummy screen as the controller screen and generate, as the glasses screen, a screen for operating the controller.

4. The control system according to claim 1, wherein each of the controllers further includes a keyboard which is arranged so as to be overlaid on the controller display.

5. The control system according to claim 1, wherein each of the controllers executes the program to generate the controller screen which notifies occurrence of a failure, and generates the glasses screen which includes a measure against the failure.

* * * * *